(12) United States Patent
Basu et al.

(10) Patent No.: US 7,252,510 B1
(45) Date of Patent: Aug. 7, 2007

(54) ENTERTAINMENT DEVICE AND METHOD OF USING THE SAME

(75) Inventors: Scott K. Basu, Depew, NY (US); Nancy M. Cariffe, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 750 days.

(21) Appl. No.: 10/134,641

(22) Filed: Apr. 30, 2002

(51) Int. Cl.
*G09B 5/00* (2006.01)

(52) U.S. Cl. .................. 434/169; 434/322; 434/335; 434/346; 434/393; 446/175; 446/227; 446/408; 446/484

(58) Field of Classification Search ............... 446/484, 446/227, 175, 397, 408; 434/159, 161, 167, 434/169, 170, 335, 337, 346, 402, 393, 322; 273/273
See application file for complete search history.

(56) References Cited

U.S. PATENT DOCUMENTS

| | | | |
|---|---|---|---|
| 2,303,223 A * | 11/1942 | Murray et al. | 446/227 |
| 4,285,517 A * | 8/1981 | Morrison | 463/9 |
| 4,336,935 A * | 6/1982 | Goldfarb | 273/460 |
| 4,359,220 A * | 11/1982 | Morrison et al. | 463/9 |
| 4,363,482 A * | 12/1982 | Goldfarb | 463/9 |
| 5,145,447 A * | 9/1992 | Goldfarb | 446/408 |
| 5,404,444 A * | 4/1995 | Billings | 345/839 |
| 5,405,153 A * | 4/1995 | Hauck | 273/460 |
| 5,437,552 A * | 8/1995 | Baer et al. | 434/317 |
| 5,668,333 A * | 9/1997 | Horton et al. | 84/470 R |
| 5,679,049 A * | 10/1997 | Arad et al. | 446/142 |
| 5,712,949 A * | 1/1998 | Kato et al. | 386/96 |
| 5,855,513 A * | 1/1999 | Lam | 463/9 |
| 5,915,261 A * | 6/1999 | Chan | 711/115 |
| 5,944,533 A * | 8/1999 | Wood | 434/322 |
| 6,021,306 A * | 2/2000 | McTaggart | 434/317 |
| 6,029,042 A * | 2/2000 | Yaron-Moallim | 434/309 |
| 6,074,212 A * | 6/2000 | Cogliano | 434/159 |
| 6,167,233 A * | 12/2000 | Gresser et al. | 434/308 |
| 6,215,057 B1 * | 4/2001 | Oren-Chazon | 84/470 R |
| 6,332,824 B2 * | 12/2001 | Tell et al. | 446/227 |
| 6,554,616 B1 * | 4/2003 | Love | 434/157 |
| 6,761,611 B2 * | 7/2004 | Wood et al. | 446/175 |

FOREIGN PATENT DOCUMENTS

GB  2 258 165 A  2/1993

* cited by examiner

*Primary Examiner*—Bena Miller
(74) *Attorney, Agent, or Firm*—Cooley Godward Kronish LLP

(57) ABSTRACT

An entertainment device that includes an output generator that produces audible outputs is disclosed. The output generator produces outputs in response to user inputs. In one embodiment, the entertainment device includes several actuators that can be activated by a user. The output generator produces different outputs in response to different user inputs.

8 Claims, 7 Drawing Sheets

| SEGMENT | PHRASE / LYRICS | |
|---|---|---|
| 1 | "Hey diddle diddle" | 510 |
| 2 | "The cat and the fiddle" | 512 |
| 3 | "The cow jumped over the moon" | 514 |
| 4 | "The little dog laughed to see such a sight" | 516 |
| 5 | "And the dish ran away with the spoon" | 518 |

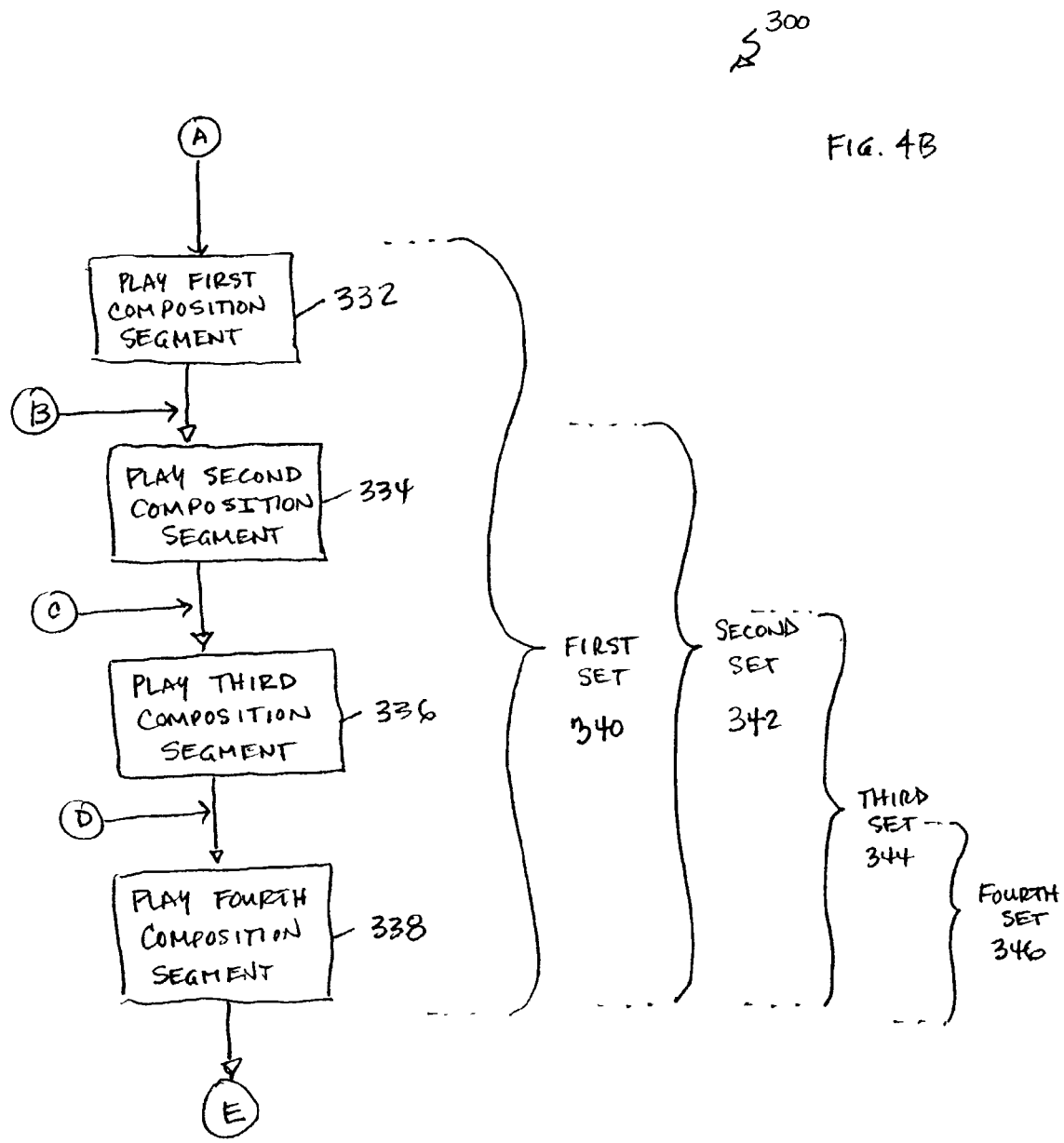

ENTERTAINMENT DEVICE AND METHOD OF USING THE SAME

FIELD OF THE INVENTION

This invention relates generally to an entertainment device, and in particular, to an entertainment device that generates different outputs in response to user inputs.

BACKGROUND OF THE INVENTION

Many different types of toys have been developed for entertainment and amusement of infants and children. Such toys have a variety of configurations and designs. Many of these toys include an output system that generates an output such as music, sound effects, and/or lights.

Some conventional toys include various user input devices. For example some toys include movable buttons or switches that a user can press or move to provide an input to the toy. Usually, the output systems of such toys generate outputs in response to activation of such input devices. Many of these toys play an audible output such as a song or a speech phrase in response to some of the user inputs. However, infants and children quickly become disinterested in conventional toys.

A need exists for an new entertainment device that provides user activated outputs. A need also exists for an entertainment device that produces different compositions in response to different user inputs. A need also exists for an entertainment device that produces different segments of a composition in response to different user inputs.

SUMMARY OF THE INVENTION

The present invention relates to an entertainment device that may be used to pacify and/or entertain an infant or child. In one embodiment, the entertainment device includes an output generator that produces audible outputs. In another embodiment, the entertainment device includes an output generator that produces visual outputs.

The entertainment device includes several user input devices. In one embodiment, the entertainment device includes several actuators that can be activated by a user. The output generator produces different outputs in response to different user inputs.

The audible output generator includes several compositions stored in memory. In one embodiment, the compositions can include lyrical content and/or musical content. In one embodiment, the audible output generator generates different segments of a composition in response to different user inputs. The different compositions or composition segments can be generated in response to activations of different actuators on the device.

The actuators may have different configurations. In one embodiment, each actuator illustrates a different item. An actuator can be configured to resemble a character or object. In another embodiment, an actuator can include a representation of a character or object.

The different compositions or composition segments can be related to the actuators of the entertainment device. In one embodiment, the different compositions or composition segments refer to the items illustrated by the actuators.

BRIEF DESCRIPTION OF THE DRAWINGS

FIG. 3 illustrates a schematic of an exemplary composition according to the present invention.

FIGS. 4A and 4B illustrate an exemplary process of using an entertainment device according to the present invention.

DETAILED DESCRIPTION OF THE INVENTION

The present invention relates to an entertainment device that may be used to pacify and/or entertain an infant or child. In one embodiment, the entertainment device includes an output generator that produces audible outputs. In another embodiment, the entertainment device includes an output generator that produces visual outputs.

The entertainment device includes several user input devices. In one embodiment, the entertainment device includes several actuators that can be activated by a user. The output generator produces different outputs in response to different user inputs.

The audible output generator includes several compositions stored in memory. In one embodiment, the compositions can include lyrical content and/or musical content. In one embodiment, the audible output generator generates different segments of a composition in response to different user inputs. The different compositions or composition segments can be generated in response to activations of different actuators on the device.

The actuators may have different configurations. In one embodiment, each actuator illustrates a different item. An actuator can be configured to resemble a character or object. In another embodiment, an actuator can include a representation of a character or object.

The different compositions or composition segments can be related to the actuators of the entertainment device. In one embodiment, the different compositions or composition segments refer to the items illustrated by the actuators.

Figure 1:
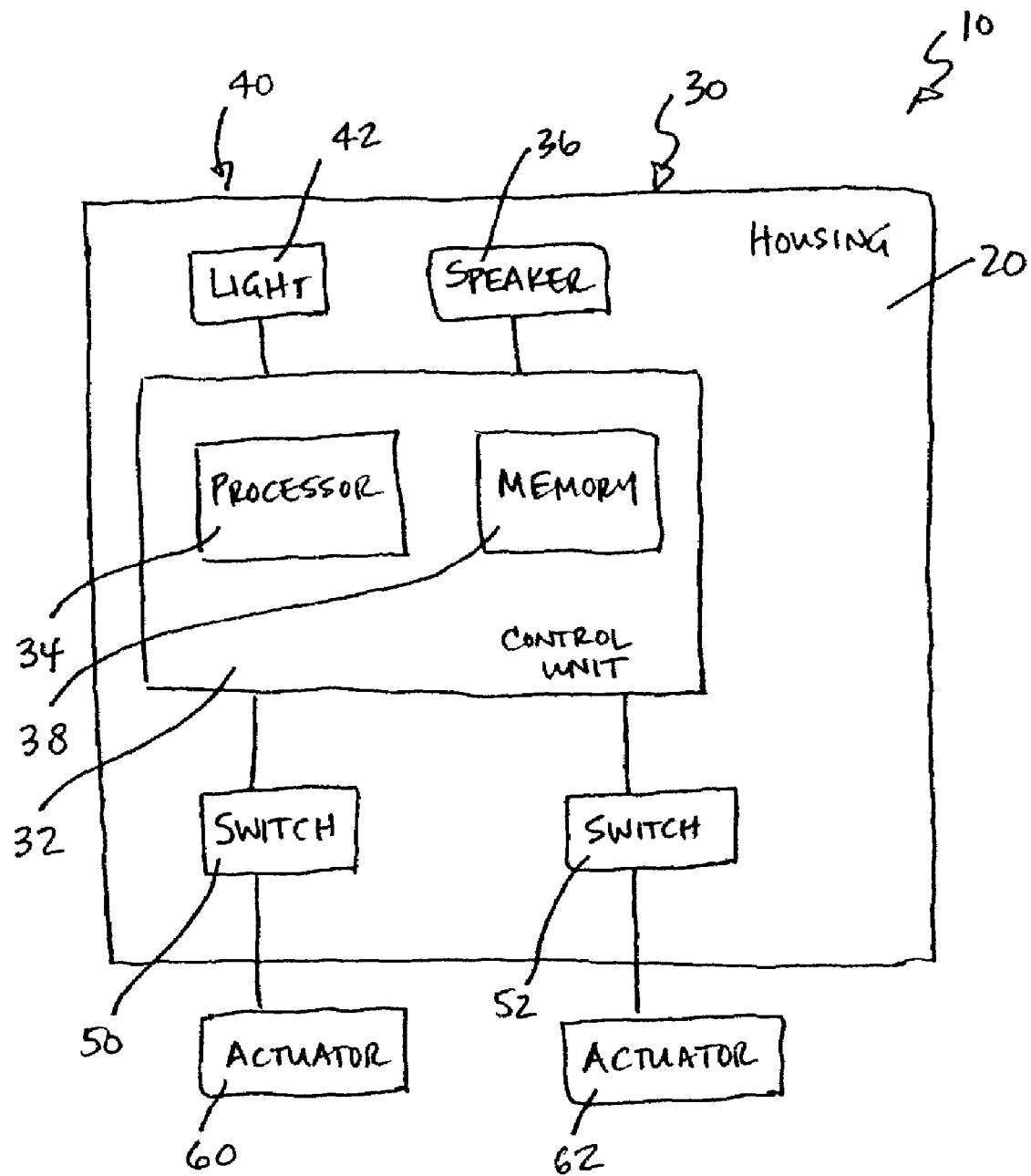
FIG. 1 illustrates a schematic view of an embodiment of an entertainment device according to the present invention.

A schematic view of an embodiment of an entertainment device according to the present invention is illustrated in FIG. 1. In this embodiment, the entertainment device or electronic toy 10 includes a housing 20 and an audible output generator or generating system 30.

In the illustrated embodiment, the audible output generator 30 includes a control unit 32 with a processor 34 and a memory 38. The audible output generator 30 also includes an audio transducer or speaker 36 connected to the control unit 32. These components of the audible output generator 30 may be any conventional devices that enable the production of audible outputs.

The entertainment device 10 includes a visual output generator 40 that generates visual outputs. In the illustrated embodiment, the visual output generator or generating system 40 includes a light 42 that is illuminated in response to particular user inputs.

In the illustrated embodiment, the entertainment device 10 includes several actuators that can be manipulated by a user. Each of the actuators is connected to a different input or switch, which is connected to the control unit 32. The audible and visual output generators 30 and 40 generate audible outputs and visual outputs, respectively, in response to actuation of the actuators by a user.

As illustrated in FIG. 1, the entertainment device 10 includes actuators 60 and 62 that are mounted to the housing 20 for movement. The actuators 60 and 62 may be mounted for any type of movement. For example, the actuators may be slidably mounted along the housing, pivotally mounted on the housing, and/or movably mounted on the housing for movement into the housing.

Actuator 60 may illustrate a particular item, such as a character or object. Actuator 60 can illustrate a particular item several ways, such as having a configuration in the shape of the item or including indicia or an image with a representation of the item. Similarly, actuator 62 may illustrate a particular item that is different than that of actuator 60.

Actuator 60 is connected to input or switch 50 and actuator 62 is connected to input or switch 52. When a user actuates actuator 60, switch 50 is activated (closed if normally open, and open if normally closed) and a corresponding input signal is sent to the control unit 32. Similarly, when a user actuates actuator 62, switch 52 is activated and a corresponding input signal is sent to the control unit 32.

In an alternative embodiment, the combination of an actuator and input or switch is replaced by, for example, a touch pad or membrane switch bearing surface indicia or graphics.

The control unit 32 includes several compositions stored in memory 38. The compositions may be any form or type of audible output. For example, the compositions may be related to music, such as lyrics of a song or instrument music for a song. The compositions may be complete songs or segments of a song. Alternatively, some compositions may be speech or sound effects that are stored in segments or phrases.

The audible output generator 30 generates a first composition or a first segment of a composition in response to the signal generated by switch 50. In the illustrated embodiment, the first composition or segment is related to actuator 60. The first composition or segment can reference the item illustrated or represented by the actuator 60.

Similarly, the audible output generator 30 generates a second composition or a second segment of a composition in response to a signal generated by switch 52. In the illustrated embodiment, the second composition is related to actuator 62. The second composition or segment can reference the item illustrated or represented by the actuator 62.

The first composition is different from the second composition. As discussed in more detail below, in the illustrated embodiment, the second composition is a subset of the first composition.

While only two actuators and two switches are illustrated for entertainment device 10, the entertainment device may include any number of actuators and corresponding switches to enable a user to provide different inputs. The particular items represented and illustrated by the actuators may be animals, people, or other objects.

Figure 2:
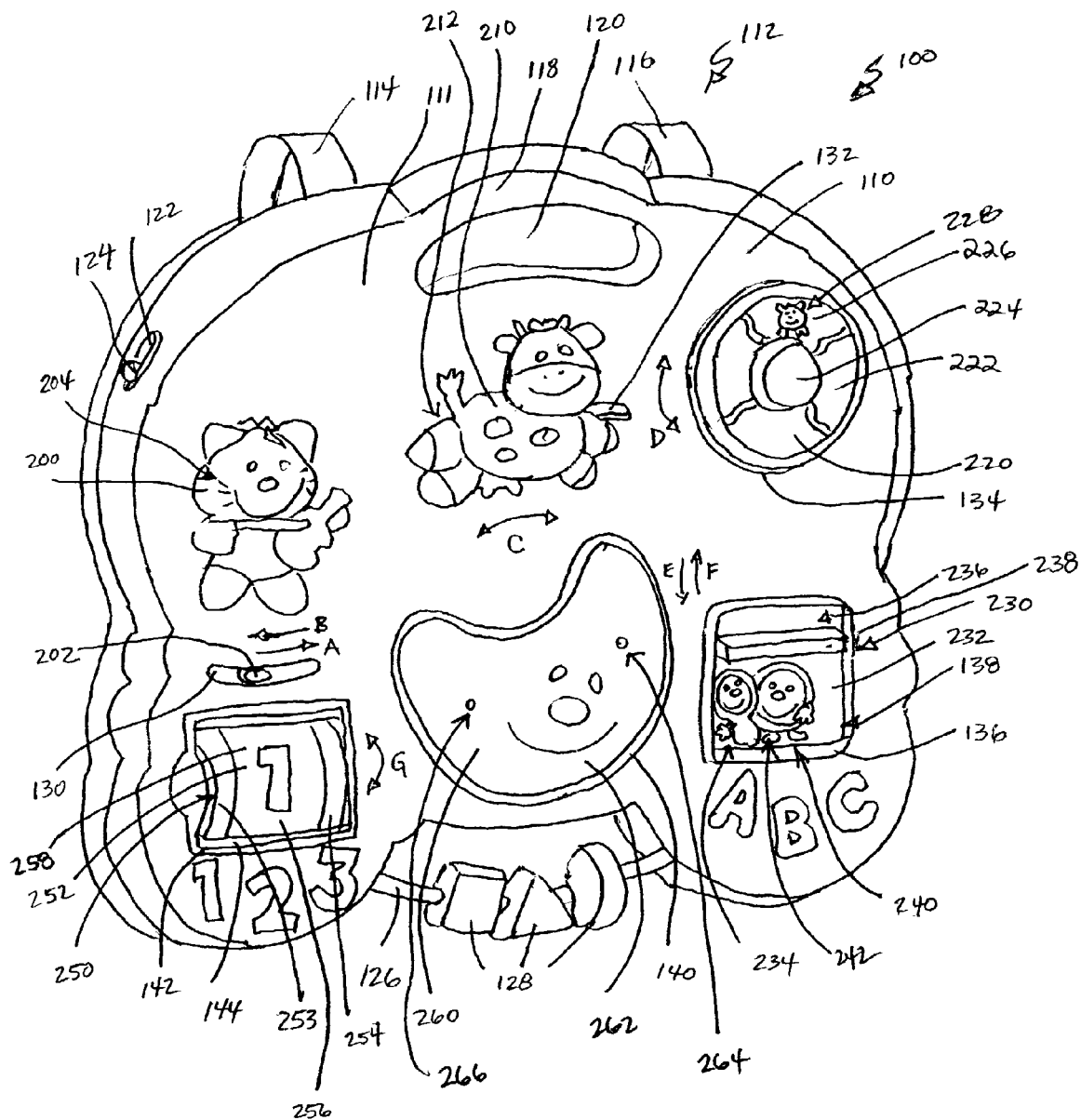
FIG. 2 illustrates a front perspective view of an embodiment of an entertainment device according to the present invention.

An embodiment of an entertainment device is illustrated in FIG. 2. The entertainment device 100 includes a housing 110 that has a front surface 111. The housing 110 also includes a handle 118 that forms an opening 120 with the housing 110.

The housing 110 has a connector 112 coupled to its upper end. The connector 112 includes straps 114 and 116 that can be wrapped around a bar or member of a infant support structure, such as a crib, to support the housing 110. The straps 114 and 116 can have openings (not shown) that can receive projections located on the rear surface of the housing 110 in a conventional manner to secure the housing 110 to the support structure.

The housing 110 includes a slot 122 and a three position power/mode switch 124 movably mounted in the slot 122. A user may adjust the mode switch 124 to select the particular mode of operation of the device 100. The entertainment device 100 includes a music mode and a learning mode. Thus, the user can move the switch 124 to a first position to select the music mode, a second position to select the learning mode, and a third position to turn off the entertainment device 100.

The housing 110 includes a play mode switch (located on the rear of the housing 110—not shown) that enables a user to select between a short play mode (eleven compositions or songs) and a long play mode (twenty-one compositions or songs). The housing 110 also includes an elongate member 126 with several sliding toys 128 mounted thereon.

In the illustrated embodiment, the entertainment device 100 includes several actuators that are mounted for movement. The entertainment device 100 also includes several switches located inside of housing 110. These switches function similarly to the inputs or switches discussed above with respect to FIG. 1.

Entertainment device 100 includes an actuator 200 pivotally mounted on the front surface 111 of the housing 110. Actuator 200 is connected to a switch inside housing 110 which sends a signal to the control unit when actuator 200 is activated or actuated.

Actuator 200 has a protrusion on its rear surface that is inserted into an opening (not shown) in the front surface 111 of the housing 110. A linkage is rotatably mounted within the housing 110 and is coupled to the protrusion of the actuator 200. At one end of the linkage is a tab 202 that extends outwardly from the housing 110 through slot 130. The linkage and the actuator 200 are biased to a base or neutral position by a spring disposed in the housing 110.

When a user moves either the actuator 200 or operation tab 202 along the direction of arrow "A" and releases it, the actuator 200 and tab 202 move in the opposite direction along arrow "B" to its base position. Actuator 200 and tab 202 can also be moved along the direction of arrow "B" initially and then released. When the actuator 200 or tab 202 is moved in either direction and released, the switch corresponding to actuator 200 is activated and a signal is sent to the control unit of the entertainment device 100.

In the illustrated embodiment, actuator 200 illustrates an item 204. In this embodiment, actuator 200 is molded into a configuration resembling a cat.

Entertainment device 100 includes an actuator 210 slidably mounted on the housing 110. Actuator 210 has a protrusion on its rear surface that is inserted into a slot 132 on the housing 110. Actuator 210 is slidable along the length of the slot 132. When a user moves actuator 210 in either direction along arrow "C," the switch corresponding to actuator 210 is activated and a signal is sent to the control unit.

In the illustrated embodiment, actuator 210 illustrates an item 212. In this embodiment, actuator 210 is molded into a configuration resembling a cow.

Entertainment device 100 includes an actuator 220 that is rotatably mounted on the housing 110. Actuator 220 includes a plate 222 that is rotatably mounted in an opening 134 in the front surface 111 of the housing 110.

The plate 222 can be independently rotated in either direction along the arrow "D." The plate 222 includes a handle 224 that can be grasped by a user to spin and rotate the plate 222. When a user rotates the plate 222, a switch corresponding to actuator 220 is activated and a signal is sent to the control unit.

In the illustrated embodiment, actuator 220 illustrates an item 228. In this embodiment, the item 228 is a dog. Actuator 220 includes a sticker or label 226 placed on the outer surface of the plate 222. The label 226 includes a representation of a dog.

Entertainment device 100 includes an actuator 230 that is slidably mounted on the housing 110. The actuator 230 includes a plate 232 that is slidably mounted in an opening 138 defined by a wall 136 on the housing 110. The plate 232 has two display portions 234 and 236 separated by a handle 238 extending outwardly from the plate 232.

The plate 232 is biased into the position illustrated in FIG. 2 by a spring in housing 110. When a user moves the handle 238 downwardly in the direction along the arrow "E" and releases the handle 238, the plate 232 returns upwardly in the direction along the arrow "F." When the plate 232 moves upwardly, the switch corresponding to actuator 230 is activated and a signal is sent to the control unit.

In the illustrated embodiment, actuator 230 illustrates an item 242. In this embodiment, item 242 is a dish and a spoon. Actuator 230 includes a sticker or label 240 placed on the lower display portion 234 of the plate 232. The label 240 includes a representation of a dish and a spoon.

Another label (not shown) is placed on the upper display portion 236 of the plate 232. In one embodiment, the label on the upper display portion 236 may include a few letters of the alphabet.

In the illustrated embodiment, actuator 220 and actuator 230 are coupled together by a conventional linkage mechanism (not shown) located within housing 110. When actuator 230 is moved downwardly and held, actuator 220 rotates simultaneously during the downward movement of the actuator 230. When actuator 230 is subsequently released, actuator 230 moves upwardly and actuator 220 automatically rotates. When actuator 230 is released, the switch corresponding to actuator 230 is closed and a signal is sent to the control unit. However, when actuator 220 is moved via actuator 230, only the switch corresponding to actuator 230 is activated.

Entertainment device 100 includes an actuator 250 rotatably mounted on housing 110. Actuator 250 includes a drum 252 that is rotatably mounted in an opening 144 defined by a wall 142 on the housing 110. The drum 252 includes two end flanges 253 and 254 and a display portion 256 therebetween. Actuator 250 includes a sticker or label 258 placed on the display portion 256 of the drum 252. In this embodiment, the label 258 includes several numbers.

When a user rotates the drum 252 in either direction along the arrow "G," the switch corresponding to actuator 200 is closed and a signal is sent to the control unit.

Entertainment device 100 also includes an actuator 260 that is movably mounted on housing 110. Actuator 260 is slidably mounted in an opening 140 on the housing 110. When a user presses the actuator 260 inwardly, the switch corresponding to actuator 260 is activated and a signal is sent to the control unit.

In the illustrated embodiment, actuator 260 includes a transparent outer surface 262 and two internal lights 264 and 266. The lights 264 and 266 are illuminated simultaneously with the playing of an audible output.

Based on the particular signal received, the control unit determines the appropriate output for the audible output generator. In the illustrated embodiment, different outputs are generated based on different user inputs made using the actuators on the entertainment device.

Entertainment device 100 includes several compositions stored in memory. In the illustrated embodiment, the entertainment device 100 includes five musical compositions. The five compositions include the songs "Hey Diddle Diddle," "Baa Baa Black Sheep," "Row Row Row Your Boat," "Three Little Kittens," and "Mary Had a Little Lamb."

For the first composition, "Hey Diddle Diddle," the complete lyrics of the song are stored. When this composition is played, the audible output generator plays all of the lyrics unless an interruption is received during the output. For each of the other compositions, the stored output includes the lyrics for the first phrase of the song and then the full song with music instruments only.

The compositions may be stored in the form of list or cycle of compositions that the entertainment device continuously outputs. The number of times that the audio output generator plays the cycle of compositions depends on the selected play mode, as discussed in more detail below.

At least one of the compositions is divided into and stored in segments. The segments of the composition may be phrases or other portions of a song, which when played sequentially, form a continuous portion of or the entire song.

An exemplary composition is illustrated in segments in FIG. 3. In this embodiment, the composition 500 is the entire song of "Hey Diddle Diddle." Composition 500 is divided into several phrases or segments that are individually stored in memory.

Composition 500 includes a first segment 510 that is the phrase "hey diddle diddle," a second segment 512 that is the phrase "the cat and the fiddle," a third segment 514 that is the phrase "the cow jumped over the moon," a fourth segment 516 that is the phrase "the little dog laughed to see such a sight," and a fifth segment 518 that is the phrase "and the dish ran away with the spoon." When these segments are output sequentially, the segments collectively form a complete song.

While composition 500 is divided into five different segments, the composition can be divided into any number of segments. In alternative embodiments, any song can be used as the composition that is divided into segments.

Figure 4A:
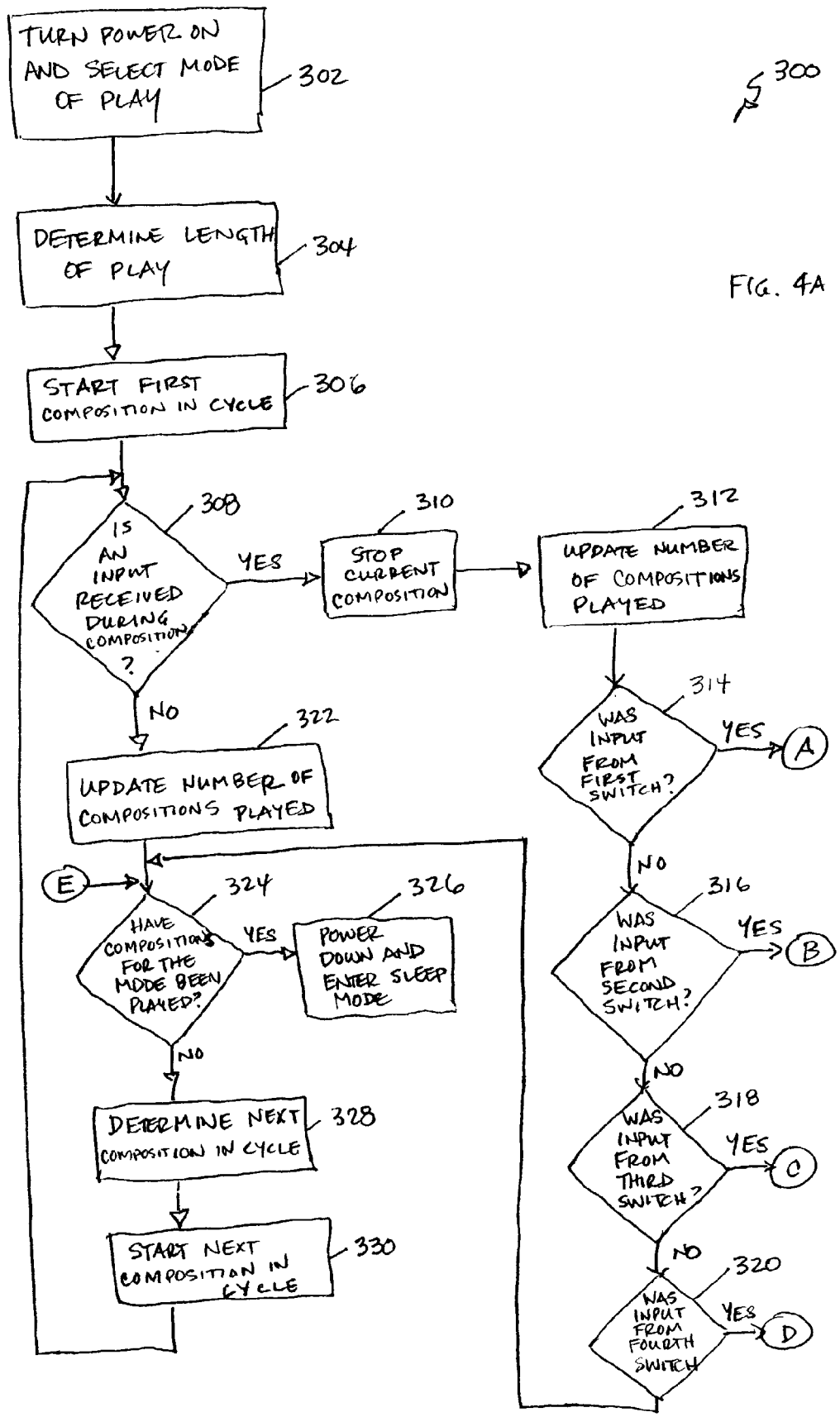

An exemplary operation of the entertainment device 100 is now described. FIGS. 4A and 4B illustrate a flowchart 300 of the generation of an output in response to a user input. Flowchart 300 illustrates some of the steps that are performed in the generating of an audible output. Other combinations of steps may be carried out to generate an audible output from the entertainment device.

At step 302, the user turns the entertainment device 100 on and selects either the short play mode or the long play mode.

At step 304, the control unit determines the number of songs to be played based on which play mode has been selected. The control unit stores and maintains a running total of the number of songs played.

At step 306, the audible output generator starts playing the first composition in the cycle. In the illustrated embodiment, the first composition is the song "Hey Diddle Diddle."

At step 308, the processor determines whether a user input is received during the playing of the composition. If an input is received, the process continues to step 310. If an input is not received, the process continues to step 322.

At step 310, the control unit interrupts and stops the playing of the current composition.

At step 312, the control unit updates the number of compositions that have been played.

At step 314, the control unit determines whether the received input corresponds to the switch associated with the first actuator. For example, when the user actuates the first actuator, its associated switch is activated which creates an input signal. In the illustrated embodiment, the first actuator corresponds to actuator 200. If the user input is associated with the first actuator, then the process continues to step 332 (see FIG. 4B).

At step 332, the audible output generator plays a first selected composition segment of a composition stored in memory. In the illustrated embodiment, the first selected composition segment is segment 512 (which is the second segment of the composition illustrated in FIG. 3) which is phrase "the cat and the fiddle." The first composition segment includes lyrics that refer to the item illustrated by the actuator 200, which is a cat. The process continues to step 334.

At step 334, the audible output generator plays a second composition segment of a composition stored in memory. The second composition segment is sequential to or follows the first composition segment in the composition. In the illustrated embodiment, the second composition segment is segment 514 which is the phrase "the cow jumped over the moon."

At step 336, the audible output generator plays a third composition segment of a composition stored in memory. The third composition segment is sequential to or follows the second composition segment in the composition. In the illustrated embodiment, the third composition segment is segment 516 which is the phrase "the little dog laughed to see such a sight."

At step 338, the audible output generator plays a fourth composition segment of a composition stored in memory. The fourth composition segment is sequential to or follows the third composition segment in the composition. In the illustrated embodiment, the fourth composition segment is segment 518 which is the phrase "and the dish ran away with the spoon."

The audible output generator plays the first segment 512 through the end of the composition, in this example through the fourth segment 518, in response to a user input via the first actuator. After the last composition segment is played, the process continues to step 324 described below.

Returning to step 314, if the input is not associated with the first actuator, then the process continues to step 316.

At step 316, the control unit determines whether the received input corresponds to the switch associated with the second actuator. For example, when the user actuates the second actuator, its associated switch is activated which creates an input signal. In the illustrated embodiment, the second actuator corresponds to actuator 210. If the input is associated with the second actuator, then the process continues to step 334 (see FIG. 4B).

As discussed above, at step 334, the audible output generator plays the second composition segment 514. The audible output generator also automatically plays the third and fourth composition segments 516 and 518 according to steps 336 and 338. In the illustrated embodiment, the audible output generator does not play the first composition segment 512 in response to actuation of the second actuator. The process then continues to step 324.

Returning to step 316, if the input is not associated with the second actuator, the process continues to step 318.

At step 318, the control unit determines whether the received input corresponds to the switch associated with the third actuator. For example, when the user actuates the third actuator, its associated switch is activated which creates an input signal. In the illustrated embodiment, the third actuator corresponds to actuator 220. If the input is associated with the third actuator, then the process continues to step 336 (see FIG. 4B).

As discussed above, at step 336, the audible output generator plays the third composition segment 516. The audible output generator also automatically plays the fourth composition segment 518 according to step 338. In the illustrated embodiment, the audible output generator does not play either of the first composition segment 512 or the second composition segment 514 in response to actuation of the third actuator. The process then continues to step 324.

Returning to step 318, if the input is not associated with the third actuator, the process continues to step 320.

At step 320, the control unit determines whether the received input corresponds to the switch associated with the fourth actuator. In the illustrated embodiment, the fourth actuator corresponds to actuator 230. If the input is associated with the fourth actuator, the process continues to step 338.

As discussed above, at step 338, the audible output generator plays a fourth composition segment. In the illustrated embodiment, the audible output generator does not play any of the first composition segment 512, the second composition segment 514, or the third composition segment 516 in response to actuation of the fourth actuator. The process continues to step 324.

If the input is not associated with the fourth actuator, then the control unit assumes that the user input is from another actuator, which corresponds to actuator 260, and the process continues to step 324.

Returning to step 308, if no input is received during the playing of the composition, the process continues to step 322.

At step 322, the control unit updates the number of compositions that have been played.

At step 324, the control unit determines whether the number of compositions associated with the selected play mode have been played. For example, in the short play mode, the control unit determines whether eleven compositions have been played. Similarly, in the long play mode, the control unit determines whether twenty-one compositions have been played. If the particular number of compositions has been played, the process continues to step 326.

At step 326, the entertainment device 100 powers down and enters a sleep mode.

Returning to step 324, if the particular number of compositions has not been played yet, the process continues to step 328.

At step 328, the control unit determines the next composition to be played based on the cycle of compositions.

At step 330, the audible output generator starts the next composition in the cycle and resumes the output cycle. The process continues with step 308 and monitors for a user input during the composition. The process continues until the number of compositions for the selected play mode have been played.

As illustrated in FIG. 4B, various combinations of the composition segments can be referred to as sets. In the illustrated embodiment, the first set 340 of composition segments includes the first through the fourth compositions segments. The second set 342 of composition segments includes the second through the fourth composition segments. The second set 342 is a subset of the first set 340.

Similarly, the third set 344 of composition segments includes the third and fourth composition segments. The third set 344 is a subset of the first set 340 and the second set 342. The fourth set 346 of compositions segments includes only the fourth composition segment. The fourth set 346 is a subset of each of the first set 340, the second set 342, and the third set 344.

In alternative embodiments, the compositions output by the audible output generator of the entertainment device may include any number of segments. In one embodiment, there may be another composition segment that follows the fourth composition segment sequentially. Alternatively, there may be one or more composition segments that precede the first composition segment.

Figure 5:
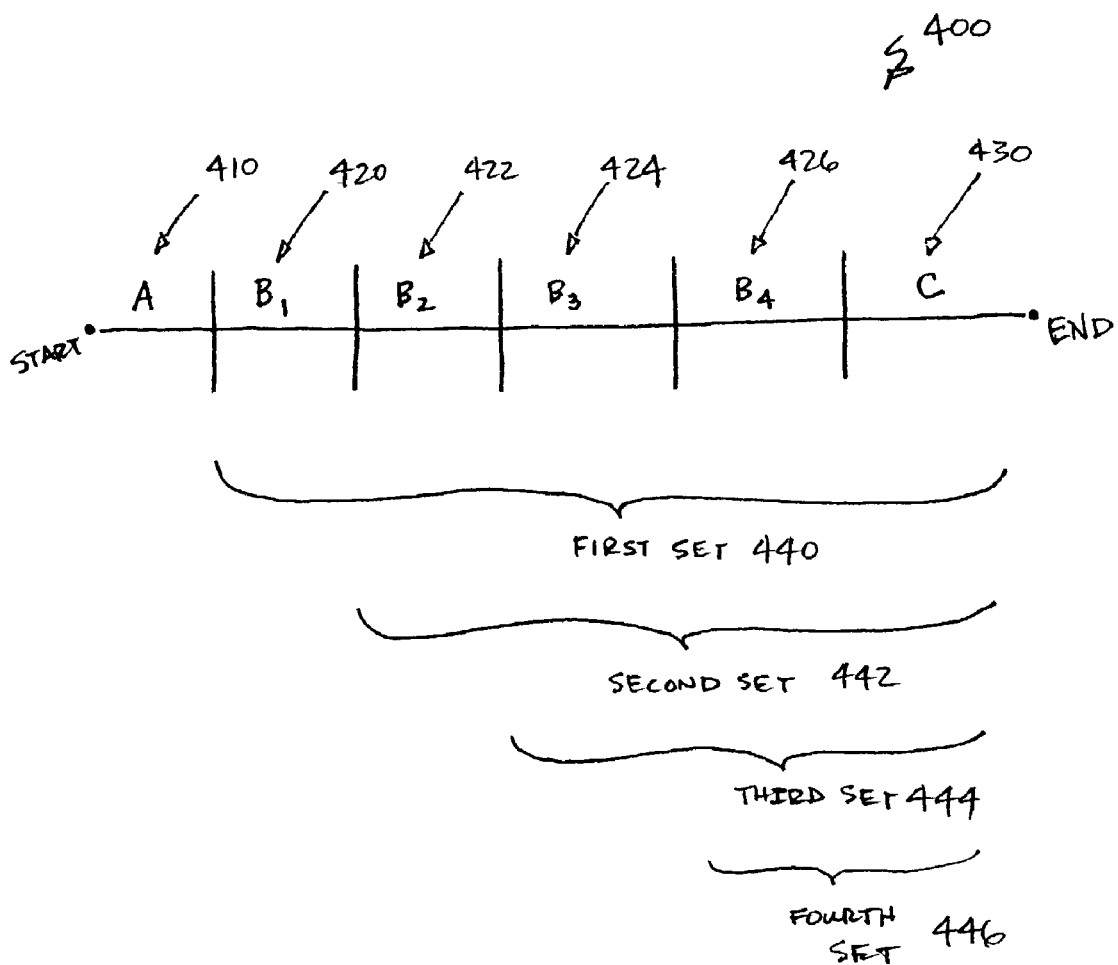
FIG. 5 illustrates a schematic of exemplary composition segments according to the present invention.

This concept is discussed relative to the exemplary composition illustrated in FIG. 5. Composition 400 is separated into several segments.

In the illustrated embodiment, composition 400 includes a beginning segment 410, middle segments 420, 422, 424, and 426, and an ending segment 430. Segments 410, 420, 422, 424, 426, and 430 are sequentially related in that when they are played sequentially, the segments collectively form a complete composition such as a song.

In the illustrated embodiment, each of the segments 420, 422, 424, and 426 are associated with different user inputs, such as actuators, on an entertainment device. Depending on the particular user input, the audible output generator of the entertainment device plays a different set of composition segments. In other words, the audible output generator begins playing the composition 400 at the segment that is associated with the user input.

As illustrated in FIG. 5, segments 420 through the end of the composition are referred to as a first set 440. Similarly, segments 422 through the end of the composition are referred to as a second set 442. Segments 424 through the end of the composition are referred to as a third set 444. Segments 426 through the end of the composition are referred to as a fourth set 446.

In alternative embodiments, composition 400 may not include either or both of segments 410 and 430. Similarly, the number of segments that correspond to actuations of the actuators can vary.

Figure 6:
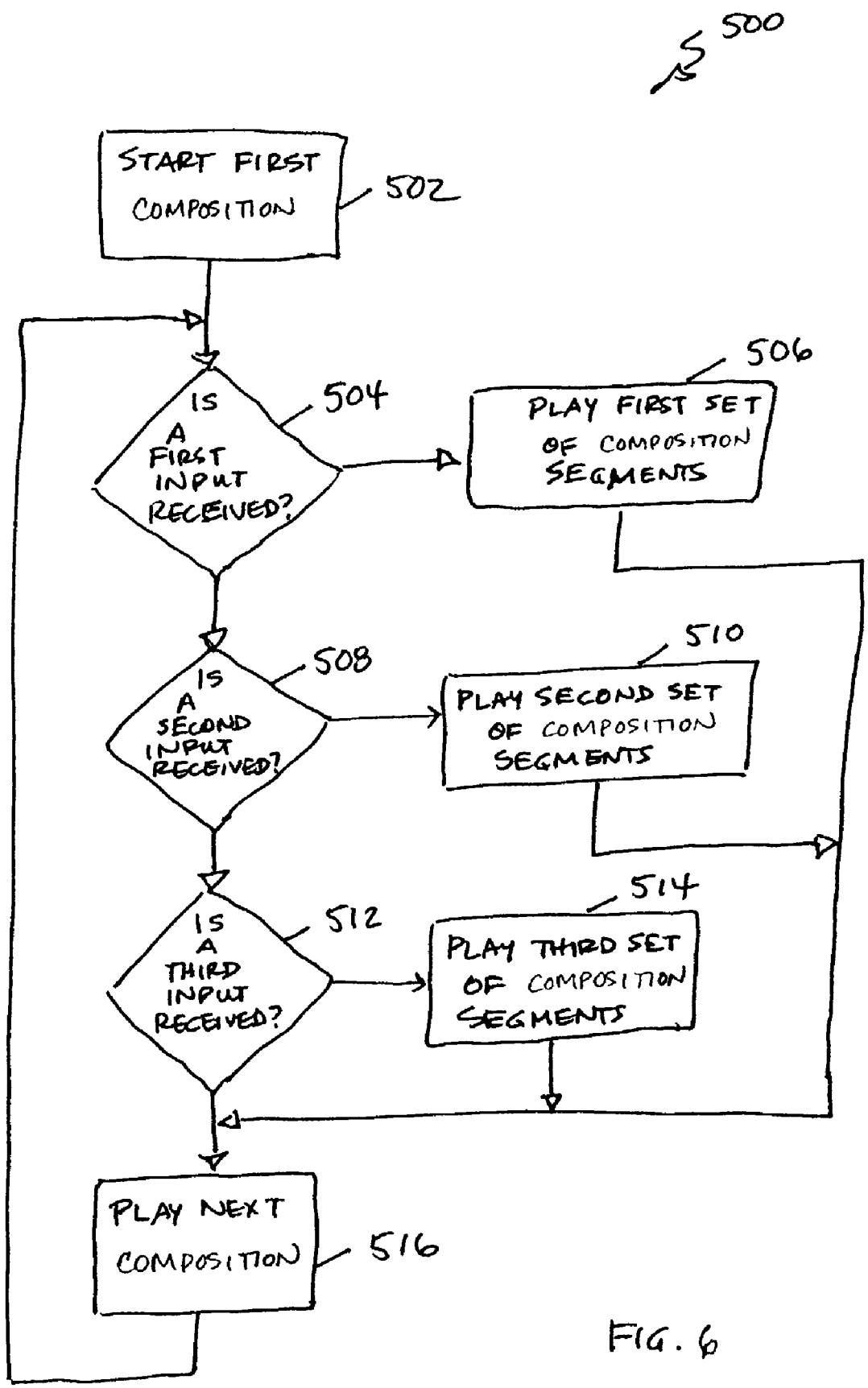
FIG. 6 illustrates an alternative process of using an entertainment device according to the present invention.

An alternative operation of the entertainment device is now described. FIG. 6 illustrates a flowchart 500 of the generation of an output in response to a user input. Flowchart 500 illustrates some of the steps that are performed in the generating of an audible output. Other combinations of steps may be carried out to generate an audible output from the entertainment device.

At step 502, the audible output generator starts playing a first composition that is stored in memory. The composition is played in its entirety unless a user input is received during the output. The control unit monitors for any user inputs during the playing of the composition.

At step 504, the control unit determines whether a first user input is received during the composition. In the illustrated embodiment, the first user input is associated with a first actuator. If a first user input is received, the process continues to step 506.

At step 506, the audible output generator plays a first set of composition segments. When the first set of composition segments is completed, the process continues to step 516.

Returning to step 504, if a first user input is not received, then the control unit determines whether a second user input is received during the composition (see step 508). If a second user input is received, the process continues to step 510.

At step 510, the audible output generator plays a second set of composition segments. When the second set of composition segments is completed, the process continues to step 516.

Returning to step 508, if a second user input is not received, then the control unit determines whether a third user input is received during the composition (see step 512). If a third user input is received, the process continues to step 514.

At step 514, the audible output generator plays a third set of composition segments. When the third set of composition segments is completed, the process continues to step 516.

Returning to step 512, if a third user input is not received, the process continues to step 516.

At step 516, the audible output generator plays the next composition stored in the cycle of compositions. The process continues until the entertainment device is turned off or a predetermined number of compositions have been played.

In alternative embodiments, each composition stored in memory is a song and the full lyrics of each song is stored. Also, the number of segments of compositions may vary.

In an alternative embodiment, a song other than "Hey Diddle Diddle" can used as the interactive song for the entertainment device. For example, the housing of the device may have several actuators corresponding to different segments in any other song.

In alternative embodiments, the shape and configuration of the actuators may vary. Also, the directions and types of movements of the actuators relative to the housing may vary.

While the invention has been described in detail and with reference to specific embodiments thereof, it will be apparent to one skilled in the art that various changes and modifications may be made therein without departing from the spirit and scope thereof. Thus, it is intended that the present invention covers the modifications and variations of this invention provided they come within the scope of the appended claims and their equivalents.

What is claimed is:

1. An electronic toy, comprising:
   a first actuator illustrating a first item, a second actuator illustrating a second item, and a third actuator illustrating a third item;
   a composition having a first segment followed sequentially by a second segment and a third segment, said first segment including lyrics that refer to said first item, said second segment including lyrics that refer to said second item, said third segment including lyrics that refer to said third item; and
   an audible output generator including a memory configured to store said composition, the audible output generator being operatively coupled to said first actuator, said second actuator, and said third actuator, said audible output generator configured to output said composition, said audible output generator being configured such that actuation of said first actuator causes said audible output generator to output at least (i) said first segment, (ii) said second segment, and (iii) said third segment, said audible output generator being configured such that actuation of said second actuator causes said audible output generator to output at least (i) said second segment and (ii) said third segment, but not said first segment, and said audible output generator being configured such that actuation of said third actuator causes said audible output generator to output at least (i) said third segment, but not said first segment or said second segment.

2. The electronic toy of claim 1, further comprising:

a fourth actuator illustrating a fourth item, said composition including a fourth segment that sequentially follows said third segment, said fourth segment including lyrics that refer to said fourth item, said audible output generator being configured such that actuation of said first actuator causes said audible output generator to also output (iv) said fourth segment, said audible output generator being configured such that actuation of said second actuator causes said audible actuation generator to also output (iii) said fourth segment, said audible output generator being configured such that actuation of said third actuator causes said audible output generator to also output (ii) said fourth segment, and said audible output generator being configured such that actuation of said fourth actuator causes said audible output generator to output at least said fourth segment.

3. An electronic toy, comprising:

a housing;

a first actuator illustrating a first item disposed on said housing;

a second actuator illustrating a second item disposed on said housing;

a composition including at least a first segment followed sequentially by a second segment, the first segment including lyrics that refer to the first item, the second segment including lyrics that refer to the second item; and an audible output generator including a memory configured to store said composition, the audible output generator configured to output said composition, said audible output generator being operatively coupled to said first actuator and to said second actuator such that actuation of said first actuator interrupts said composition and causes said audible output generator to output at least said first and second segments and actuation of said second actuator interrupts said composition and causes said audible output generator to output at least said second segment but not said first segment.

4. The electronic toy of claim 3, said composition further including a third segment such that actuation of said first actuator causes said audible output generator to also output said third segment and such that actuation of said second actuator causes said audible output generator to also output said third segment.

5. The electronic toy of claim 3, said composition including music.

6. The electronic toy of claim 3, said first segment and said second segment each including different song lyrics.

7. The electronic toy of claim 3, further comprising:

a connector disposed on said housing for mounting said housing to a support.

8. The electronic toy of claim 7, said connector including a strap.

* * * * *